(12) United States Patent
Mobers et al.

(10) Patent No.: US 6,542,386 B2
(45) Date of Patent: Apr. 1, 2003

(54) SWITCHED MODE POWER REGULATOR

(75) Inventors: Antonius Maria Gerardus Mobers, Nijmegen (NL); Joan Wichard Strijker, Nijmegen (NL); Wim Bosboom, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/976,330

(22) Filed: Oct. 12, 2001

(65) Prior Publication Data

US 2002/0122319 A1 Sep. 5, 2002

(30) Foreign Application Priority Data

Oct. 13, 2000 (EP) .............................................. 00203532

(51) Int. Cl.$^7$ .............................................. H02M 3/335
(52) U.S. Cl. ....................................... 363/21.01; 363/97
(58) Field of Search ................................. 363/20, 21.01, 363/21.08, 21.09, 131, 95, 97

(56) References Cited

U.S. PATENT DOCUMENTS

| 4,864,480 A | 9/1989 | Melcher | 363/21 |
| 5,453,921 A | * | 9/1995 | Shutts | |
| 5,999,421 A | * | 12/1999 | Liu | |

OTHER PUBLICATIONS

R. Quaglino et al, "a Monolithic Full–Integrated Device for Off–Line Switching Power Supply" EPE '97, 7$^{th}$ European Conference on Power Electronics and Applications. Trondheim, 9/8–Oct. 1997, EPE. European Conference on Power Electronics and Applications, Brussels, EPE Association, B, vol. 3 Conf. 7 pages 3083–3087, XP000768269.

"MC3337X Hochspannungs—Schaltregler Fuer Einfache Netzteile" Elektronik, Franzis Verlag GMBH, Munchen, DE, vol. 47, No. 22, Oct. 27, 1998, p. 18, XP000862475.

* cited by examiner

Primary Examiner—Adolf Deneke Berhane
(74) Attorney, Agent, or Firm—Steven R. Biren

(57) ABSTRACT

The present invention relates to a switched-mode power supply comprising a transformer (T1) having an additional control winding (N2). This control winding (N2) forms part of an over power protection system by providing information relating to the line voltage $V_{line}$. Additionally, the control winding (N2) forms part of an over voltage protection system by monitoring the output voltage, $V_{out}$, of the switched-mode power supply. The sensing of $V_{line}$ and the monitoring of $V_{out}$ is performed in a time phased way so that the same control winding (N2) may be used to provide a plurality of information relating to the performance/status of the switched-mode power supply.

11 Claims, 6 Drawing Sheets

SWITCHED MODE POWER REGULATOR

FIELD OF THE INVENTION

The present invention relates to a switched-mode power supply having an over power and over voltage protection circuit. In particular, the present invention relates to a switched-mode power supply comprising a primary circuit for receiving an input voltage, a secondary circuit for providing an output voltage, and a monitoring circuit for providing information relating to the input voltage in a first period of time and relating to the output voltage in a second period of time.

BACKGROUND OF THE INVENTION

In general, electric equipment must be designed to operate under a broad variety of electrical environments. Power supplies for international applications are typically designed to accept line voltages/input voltages $V_{line}$ in the range ~85–276 $V_{ac}$. This voltage span is required in order to cover most geographical areas including Europe and USA.

A widely used type of power supply is the switched-mode power supply shown in FIG. 1, where the input voltage/line voltage $V_{line}$ is transformed to an output voltage, $V_{out}$—the level of $V_{out}$ typically but not necessarily being less than the level of $V_{line}$. The primary circuit 1 receives the line voltage $V_{line}$ which, in a time phased way, is transformed to the secondary circuit 2 using the transformer 3. The transformer forms galvanic isolation between the primary and secondary circuits. In order to obtain a DC-like output voltage the secondary circuit typically includes means for rectifying the output signal. As shown in FIG. 1 the means for rectifying the output voltage may comprise a diode based rectifier and a capacitor.

The level of $V_{out}$ is controlled by controlling the current in the primary circuit, $I_p$, using the controllable switch 4. $I_p$ is determined by measuring a voltage drop across resistor 5. The measured voltage drop—which represents $I_p$—is provided as a control signal to a Pulse Width Modulator (PWM) circuit. The PWM-circuit adjusts the conduction time of the controllable switch 4 so as to obtain a predetermined current value. Typically, the controllable switch 4 is a transistor. The primary winding of the transformer has the inductance L. When the PWM-circuit switches the transistor on, $I_p$ starts to build up in the primary circuit. The increase of $I_p$ during $t_{on}$ ($t_{on}$ is the conduction time of the transistor) is illustrated in FIG. 2. FIG. 2 also illustrates the voltage across the controllable switch 4 and the current in the secondary circuit, $I_s$. The dashed line shows $V_{line}$.

The controllable switch is switched off when $I_p$ has reached a predetermined value. Thus, the conduction time is dependent on the predetermined level of the $I_p$—i.e. increasing the level of $I_p$ increases the conduction time. For obvious reasons the conduction time is also dependent on the level of the input voltage and the inductance, L, of the primary winding of the transformer.

When the predetermined level of $I_p$ has been reached the controllable switch 4 is turned off, and the magnetically stored energy in the transformer 3 is transformed to the secondary circuit 2. The transformation of energy to the secondary circuit induces a current, $I_s$, in the secondary circuit. $I_s$ is rectified using e.g. the diode based rectifier and the capacitor 7 in combination.

The input power to the primary circuit is given by:

$$P = \tfrac{1}{2} L I_p^2 f, \qquad (1)$$

where L is the inductance of the primary winding, f is the PWM operation frequency ($f = 1/T_{PWM} = 1/(t_{on}+t_{off}+t_{valley})$) and $I_p$ is the current in the primary circuit.

One problem that arises with prior art switch-mode power supplies is the fact that in order to over power protect a power supply at a fixed operation frequency, $I_p$ must be limited.

Instead of operating the power supply with a fixed frequency, the prior art also discloses system operating with a variable operation frequency—the so-called self-oscillating power supplies (SOPS). In SOPS's the maximum power is not only dependent on $I_p$ but also dependent on $V_{line}$ because the operating frequency depends on $V_{line}$. This dependency is illustrated in FIGS. 3 and 4, where FIG. 3 illustrates the situation of a low $V_{line}$ and FIG. 4 illustrates the situation of a high $V_{line}$. Comparing FIGS. 3 and 4 it is evident that the time required to obtain a predetermined value of $I_p$ is shorter in the case of the high $V_{line}$. The shorter time required in FIG. 4 results in a higher operation frequency. In prior art SOPS's a higher operation frequency means that more power is provided to the transformer. The increased amount of power provided to the transformer may reach damaging levels.

However, in the prior art, over power protection circuits for power supplies are known. Depending on the type of circuit being used, the prior art circuit shuts down the power supply, "crowbars" the faulty output, or switches the power supply to a different operating mode. A typical over power protection circuit according to the prior art is shown in FIG. 5.

It is a disadvantage of the prior art protection circuit shown in FIG. 5 that four additional external components (R1, R3, R4 and Z1) are required. Such components are difficult to integrate in an integrated circuit since they take up too much die area. In addition, such components increase the power consumption significantly and are susceptible for noise due to the high ohmic circuitry. Also, prior art arrangements as shown in FIG. 5 are less accurate.

It is a further disadvantage of the prior art power supplies shown in FIGS. 1 and 5 that in order to obtain information relating to the output voltage a separate feedback loop/control loop must be implemented. In case such a loop is broken no information relating to the output voltage is available, and thus, no protection against damages due to over voltage on the secondary circuit is available.

It is a still further disadvantage of the prior art protection circuits that at least one additional pin on the integrated circuit is required in order to get access to the external components.

SUMMARY OF THE INVENTION

It is an object of the present invention to provide an over voltage and an over power protection circuit for switched-mode power supplies. The invention is defined by the independent claims. The dependent claims define advantageous embodiments.

Advantageously, an integrated circuit is provided with an integrated over voltage and over power protection circuit without the use of additional die demanding external components. A consequence of this is the fact that no additional pins on the integrated circuit are required. Furthermore, external feedback loop/control loops can be avoided.

In principle, the energy storing device may be formed by a set of magnetically coupled coils. Preferably, the energy storing device may comprise a transformer. In that case the first coil may comprise the primary winding of that transformer whereas the second coil may comprise the secondary winding of that transformer.

The monitoring means may comprise a third winding of the transformer. This third winding may be galvanic separated from the first and second winding. The number of windings of the third winding may be considerable less than the number of windings of the first winding.

The switched-mode power supply according to the first aspect of the present invention may further comprise a control circuit for controlling the controllable current switching means. The control circuit may comprise a PWM-circuit operating the switch at a frequency between 25–250 kHz. The control circuit typically response to a control signal from the third winding. This control signal may comprise a information relating to the performance or status of the switched mode power supply. Preferably, the control signal relates to the input voltage to the power supply in the first period of time. In the second period of time the control signal relates to the output voltage of the power supply.

Since a plurality of information is provided via the same control signal the control circuit may receive that information via a single input pin.

The controllable current switching means forming part of the primary circuit must be able to handle the current flowing in the primary circuit. Suitable candidates may be selected from the group consisting of MOSFET transistors, Bipolar transistors, IGBTs or GTOs or any combination thereof. Preferably, the controllable current switching means is connected in series with the primary winding of the transformer. In order to determine the current flowing in this circuit a resistor is included within the circuit so that the current may be determined by measuring the voltage generated across this resistor.

BRIEF DESCRIPTION OF THE DRAWINGS

The present invention will now be explained in further details with reference to the accompanying drawings, where.

DESCRIPTION OF PREFERRED EMBODIMENTS

In its simplest form, the present invention provides a switched-mode power supply comprising a transformer having a control winding. This control winding forms part of an over power protection system by providing information relating to the line voltage $V_{line}$. Additionally, the control winding forms part of an over voltage protection system by monitoring the output voltage $V_{out}$ of the switched-mode power supply. As it will be explained in further details below, the sensing of $V_{line}$ and the monitoring of $V_{out}$ is performed in a time phased way.

Figure 6:
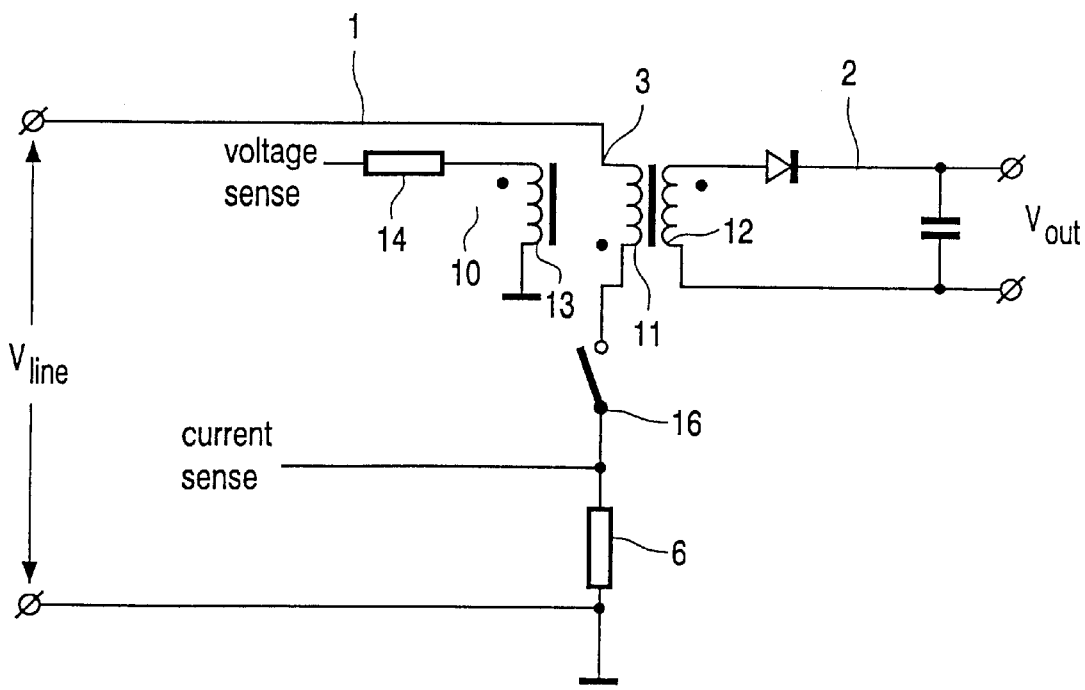
FIG. 6 is a schematic diagram of the over voltage protection principle according to the present invention.

Referring now to FIG. 6, a switched-mode power supply for supplying electrical power from a power source, such as the power mains, is shown. The power supply comprises a primary circuit 1 being formed by the primary winding 11 of the transformer 3, a controllable switch 16 and a resistor 5 for limiting the current in the primary circuit 1. The primary circuit is connected to the line voltage $V_{line}$. The secondary circuit 2 is formed by the secondary winding 12 of the transformer 3 and components for generating a DC-like output voltage, $V_{out}$. The transformer 3 forms galvanic isolation between the primary and secondary circuits.

The winding ratio k between the control winding 13 and primary winding 11 of the transformer 3 is given by:

$$k = \frac{\text{\# control windings}}{\text{\# primary windings}}$$

Similarly, the winding ratio m between the control winding 13 and the secondary winding 12 is given by:

$$m = \frac{\text{\# control windings}}{\text{\# secondary windings}}$$

One end of the control winding 13 is connected to ground whereas the other and of the control winding is connected to resistor 14. By clamping the left side of resistor 14 to a fixed potential a current will flow through resistor 14 when this potential is different from the voltage generated across control winding 13. By measuring the current flowing through resistor 14 the voltage generated across the control winding 13 can be determined.

The output voltage of the switched power supply, $V_{out}$, is controlled by controlling the current in the primary circuit $I_p$. $I_p$ is controlled by operating switch 16 in a time phased way using a driving circuit (not shown). $I_p$ is sensed by measuring the voltage generated across resistor 5. The measured voltage is used as a control signal to the gate driving circuit (not shown), which—in response the control signal—controls the conduction time of switch 16.

Upon switching switch 16 on $I_p$ starts to build up in the primary circuit 1. When $I_p$ reaches a predetermined level, switch 16 is turned off. After switching switch 16 off the energy stored in transformer 3 is transferred to the secondary circuit 2. This energy transfer induces a current $I_s$ in the secondary circuit 2.

When a current flows in either of windings 11 or 12, a current will also be induced in regulation circuit 10. The voltage generated across control winding 13 is related to $V_{line}$ or $V_{out}$ according to ratios k and m, respectively. A sensing circuit (not shown) measures the current flowing through resistor 14. Thus, knowing the value of resistor 14, $V_{line}$ and $V_{out}$ can be monitored. If the resistor 14 has resistance R, the current in the regulation circuit 10, $I_r$, is related to $V_{line}$ during $t_{on}$ in the following way $$I_r = \frac{kV_{line}}{R}, \tag{2}$$

whereas, during $t_{off}$, the current is related to $V_{out}$ in the following way $$I_r = \frac{mV_{out}}{R}. \quad (3)$$

Hence by monitoring the voltage in control winding 13 in a time phased way, not only $V_{out}$ can be monitored in order to provide over voltage protection in the secondary circuit 2, but also $V_{line}$ can be monitored in order to provide over power protection by operating the gate driving circuit in an appropriate way. Thus, the control voltage generated across the control winding 13 is related to $V_{line}$ during the conduction time (primary stroke) and related to $V_{line}$ during the non-conduction time (secondary stroke).

Figure 1:
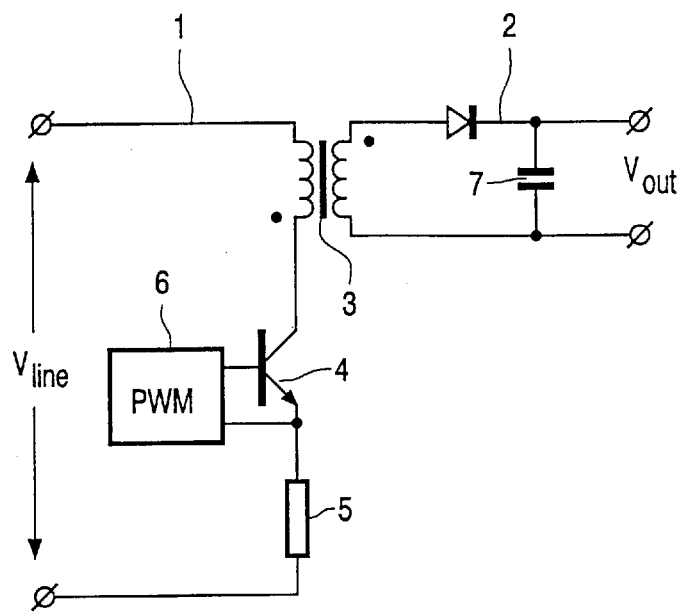
FIG. 1 is a schematic diagram of a switched-mode power supply according to the prior art.
Figure 2:
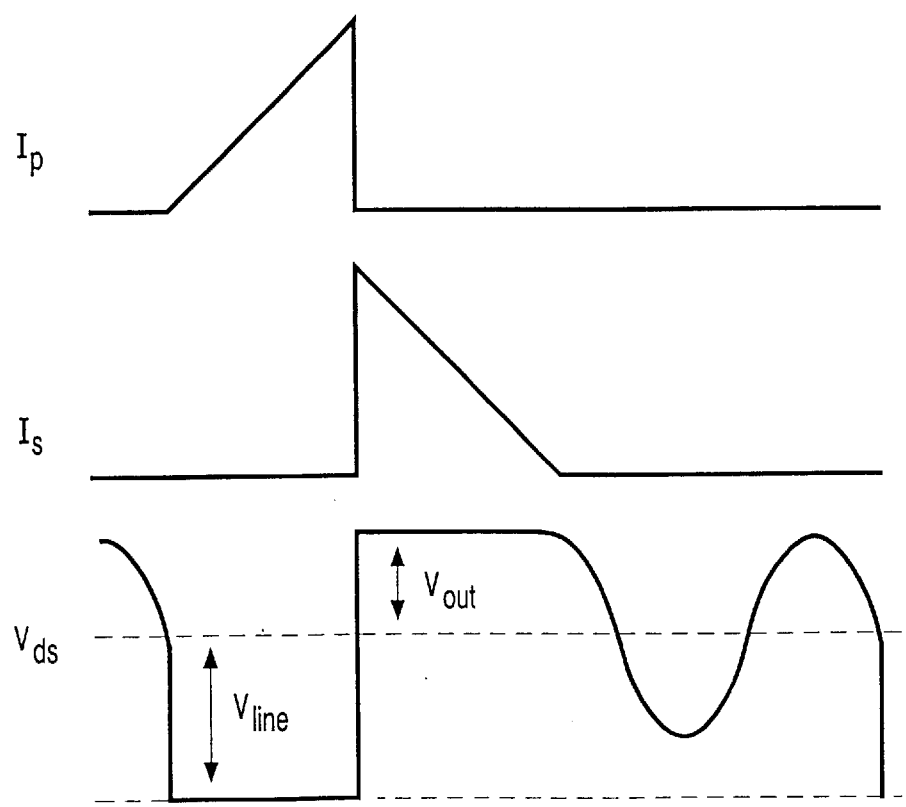
FIG. 2 is a graph showing various currents and voltages during an operation period of the switched-mode power supply of FIG. 1.
Figure 3:
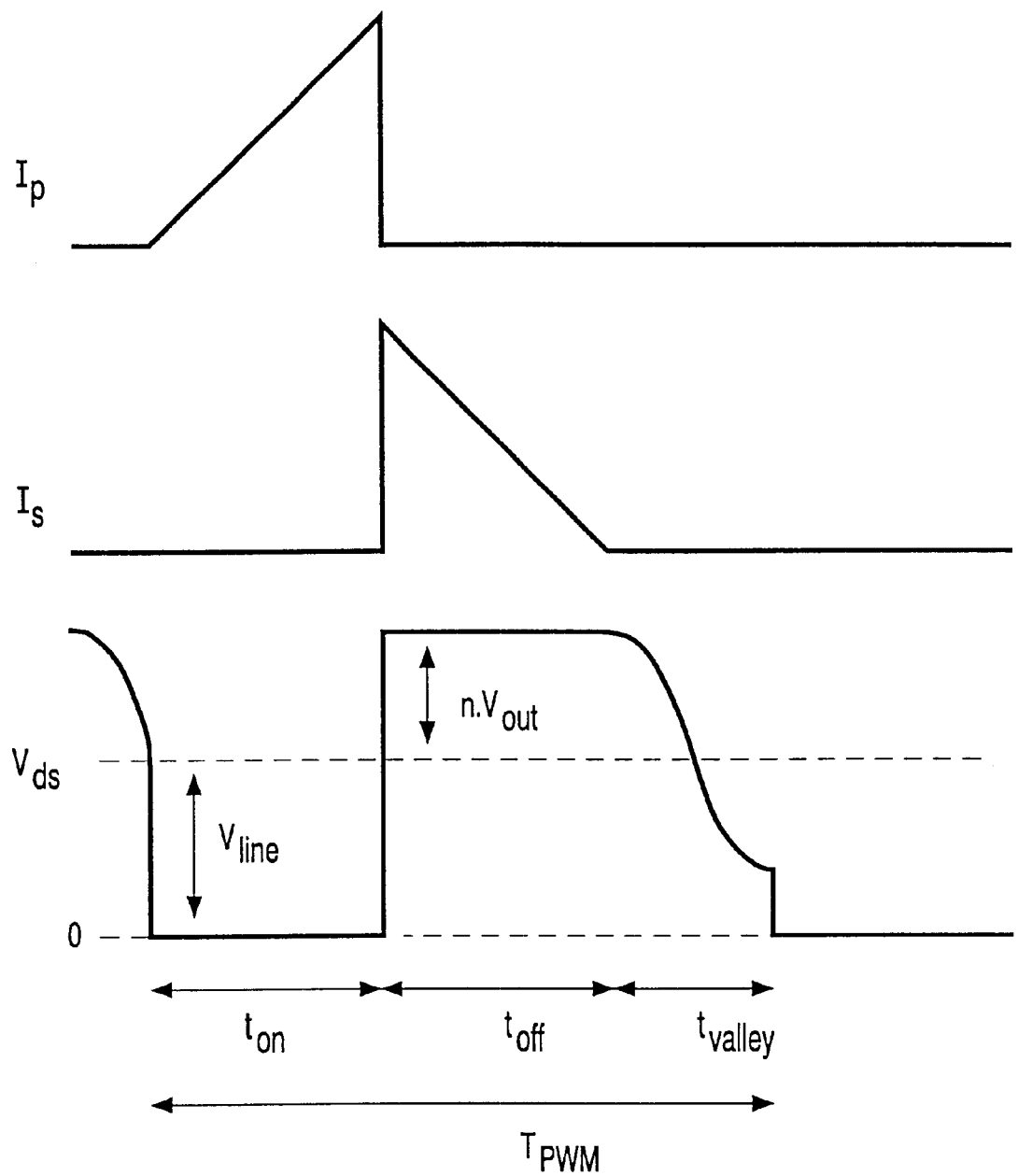
FIG. 3 shows graphs similar to FIG. 2 but for a self oscillating power supply with low line voltage.
Figure 4:
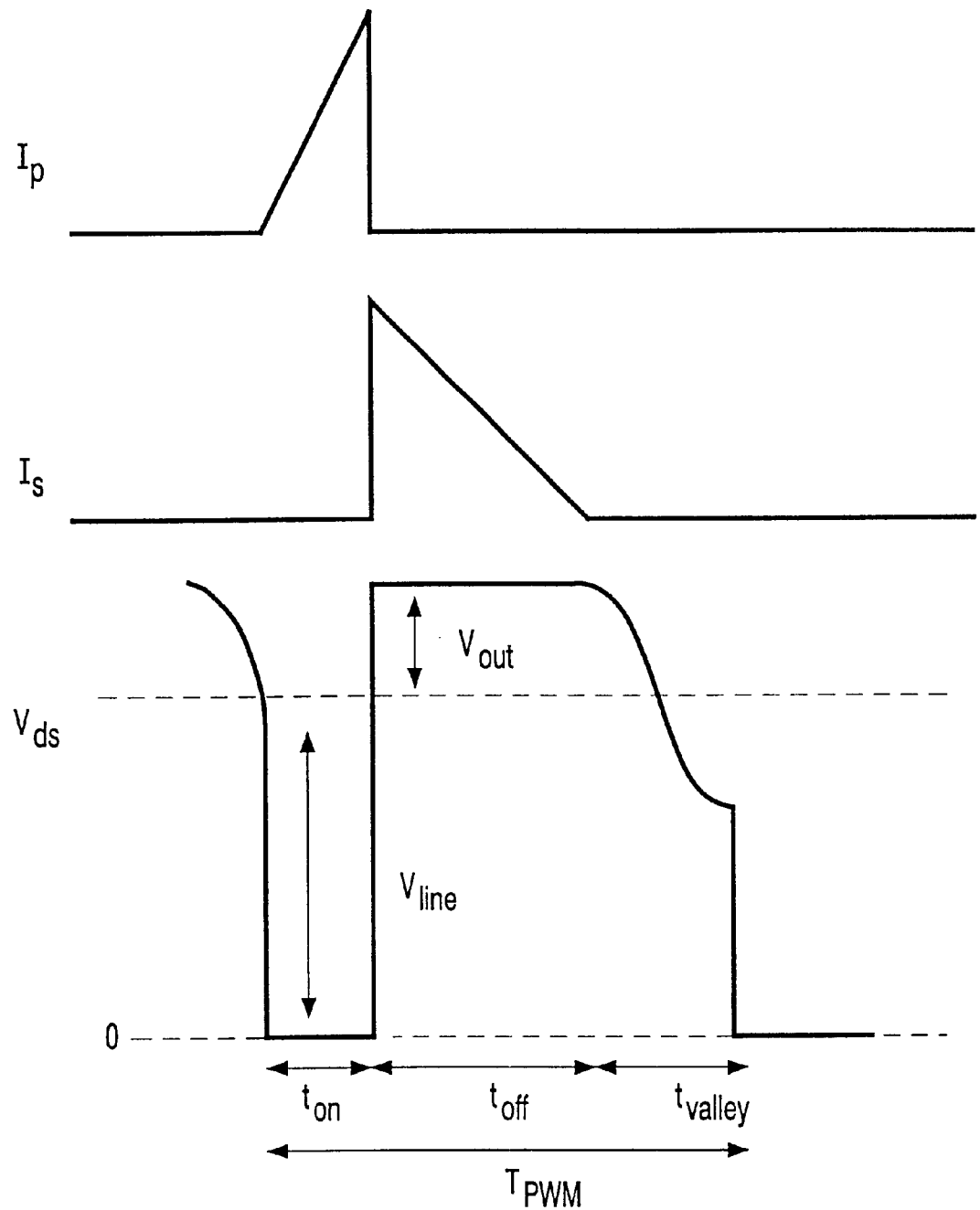
FIG. 4 shows graphs similar to FIG. 3 but for high line voltages.
Figure 5:
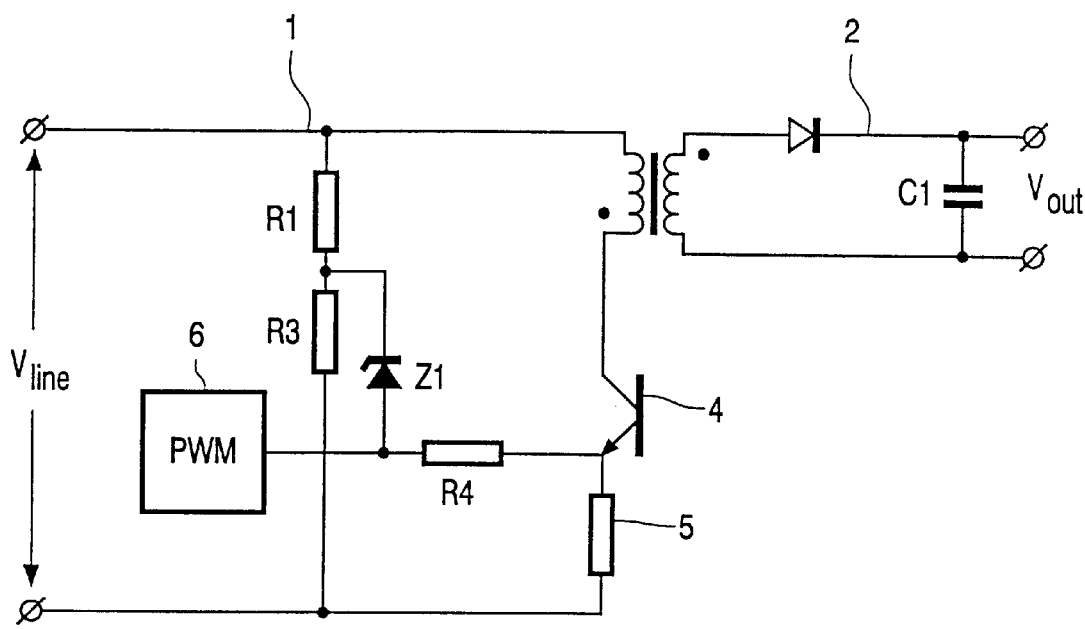
FIG. 5 is a schematic diagram of a prior art switched-mode power supply comprising line voltage compensation.

It is important to note that due to the opposite signs of $V_{line}$ and $V_{out}$ relative to $V_{ds}$—see e.g. FIG. 2—the direction of the current flowing in resistor 14 during $t_{off}$, is away from the transformer (positive current) whereas during $t_{on}$ the direction of the current in resistor 14 is towards the transformer (negative current).

It is an advantage of the present invention that the information obtained during the primary and secondary strokes are provided via the same existing pin on the integrated circuit receiving and processing the information thereby avoiding the additional external components as suggested in the prior art.

Figure 7:
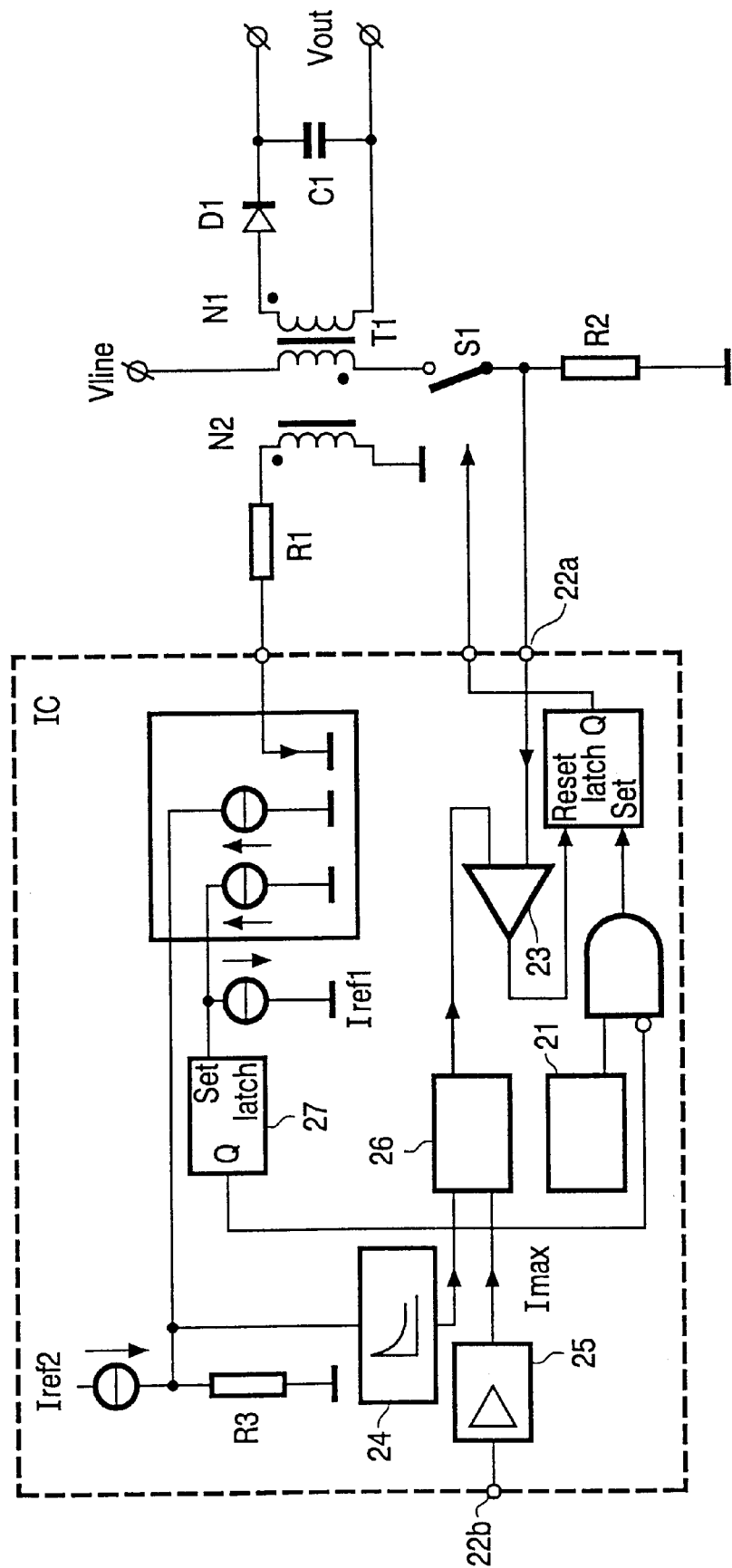
FIG. 7 is a schematic diagram of a preferred embodiment of the present invention.

Referring now to FIG. 7, the switch S1 is controlled by a PWM signal from a PWM circuit. The switch is switched on by the set signal from the oscillator 21. The switch is switched off if a certain peak current through S1 is sensed. As previously mentioned, the peak current through S1 is sensed by sensing the voltage generated across R2. This sensed voltage is provided through pin 22*a*. As soon as the comparator 23 trips, S1 is switched off.

Besides the input signal from 22*a*, also a signal from the over power protection circuit is used to determine the peak current through S1 and R2. For this purpose the information relating to $V_{line}$ is used. This information is retrieved from the control winding N2 of the transformer. The $V_{line}$ information is processed in the 'curve' circuit 24. The processor is a multiplier that transforms the input signal into the square root of the signal. The square root is taken, because for this system the optimum compensation will be made. Alternatively, a linear function will also do, but then the maximum output power still has quite some $V_{line}$ dependence.

The information from the over power protection circuit can reduce the peak current if the output signal is lower than the signal from the error amplifier 25 on pin 22*b*. The magnitude of both signals is sensed by the minimum (min.) circuit 26. As previously mentioned the information relating to $V_{line}$ will be present on the control winding N2 during the primary stroke, whereas information relating to the output voltage $V_{out}$ will be present during the secondary stroke. Therefore, the very same pin on the IC can be used for obtaining both types of information.

As previously mentioned, information relating to $V_{out}$ is available during the secondary stroke. If it is determined that $V_{out}$ comes above a predetermined level a latch is set in circuit 27. This latch prevents switch S1 from switching on again so as to shut down the switched-mode power supply in case of an over voltage being present on the output terminals.

Figure 8:
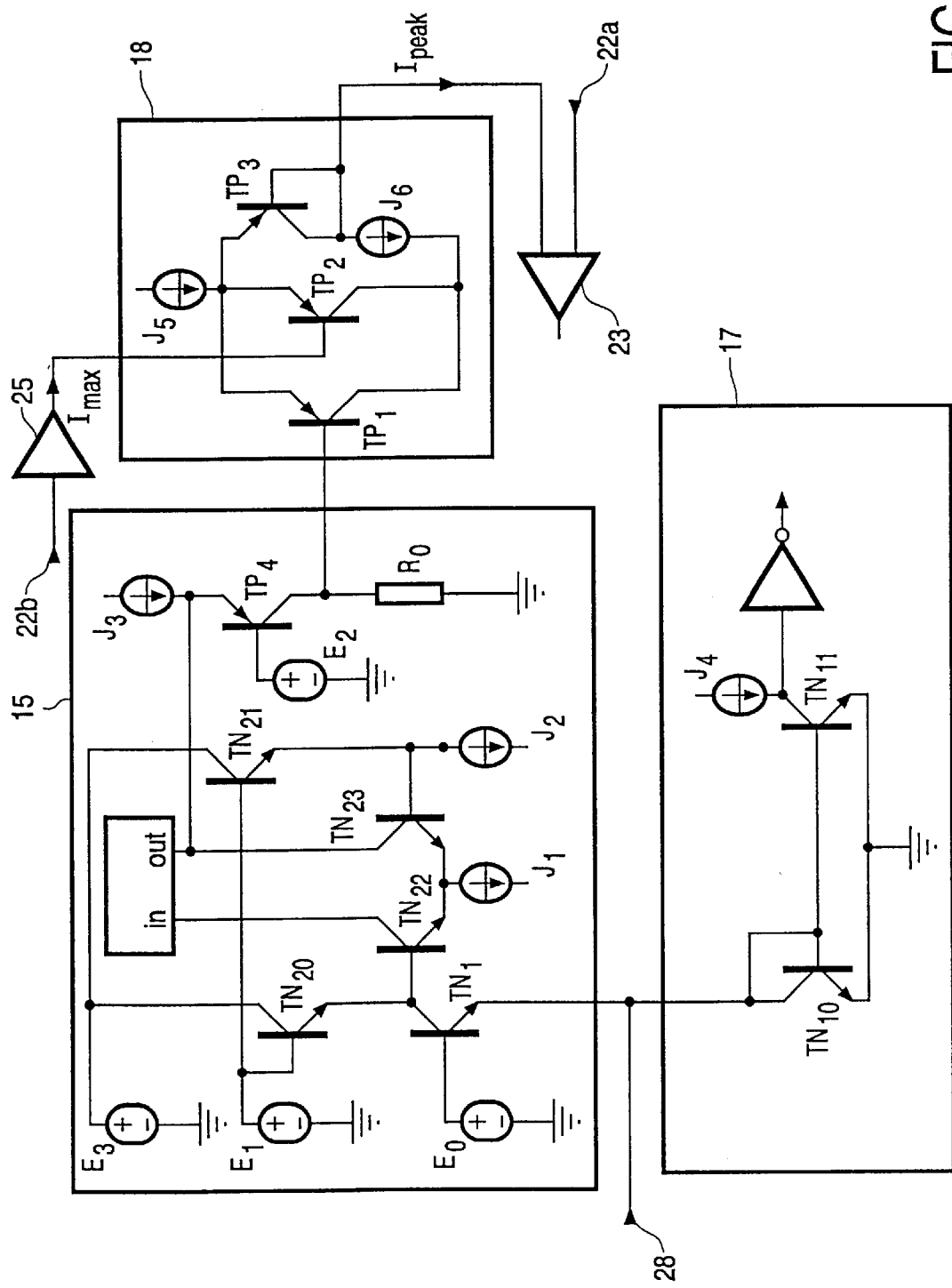
FIG. 8 shows an implementation of the switched power supply according to the present invention.

An implementation of the switched power supply according to the present invention is shown in FIG. 8. The over voltage protection circuit is block 17 whereas block 15 and 18 in combination forms the over power protection circuit. Terminal 28 is to be connected to the left leg of resistor R1 in FIG. 7. It will be evident for the skilled person in the art that there are several ways of implementing the over voltage protection circuit and the over power protection circuit.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A switched-mode power regulator comprising
   an energy storing device (3) comprising a first (11) and a second (12) coil,
   a primary circuit (1) comprising controllable current switching means (16) and the first coil (11) of the energy storing device (3), said controllable current switching means (16) being adapted to control a current in the first coil (11) of the energy storing device (3) so as to provide energy to the energy storing device in a controllable way and in a first period of time,
   a secondary circuit (2) for releasing energy from the energy storing device in a second period of time, the second coil (12) forming part of the secondary circuit,
   monitoring means (10) being adapted to provide information relating to an output voltage from the secondary circuit in the second period of time, characterized in that
   the monitoring means (10) further is adapted to provide information relating to an input voltage to the primary circuit in the first period of time,
   wherein the monitoring means comprises a third coil having a number of windings that is fewer than a number of windings of the first coil, and the current switching means is caused to open when the monitoring means senses excess output voltage.

2. A switched-mode power regulator according to claim 1, wherein the energy storing device (3) comprises a transformer, and wherein the first coil (11) comprises a primary winding of the transformer, wherein the second coil (12) comprises a secondary winding of the transformer, and wherein the monitoring means (10) comprises a third winding (13) of the transformer.

3. A switched-mode power regulator according to claim 1, further comprising a control circuit (IC) for controlling the controllable current switching means (SI) in response to a control signal from the monitoring means indicating an over power surge.

4. A switched-mode power regulator according to claim 3, wherein the control signal from the monitoring means relates to the input voltage in the first period of time, and wherein the control signal from the monitoring means relates to the output voltage in the second period of time.

5. A switched-mode power regulator according to claim 3, wherein the control signal from the monitoring means is received by the control circuit via a single input pin.

6. A switched mode power regulator according to claim 1, further comprising an integrated circuit (IC) having a single pin for receiving both information relating to an input voltage to the primary circuit in a first period of time in which energy is stored in the energy storing device (3) and information relating to an output voltage from the secondary circuit in a second period of time in which energy is released from the energy device (3).

7. A switched-mode power regulator according to claim 3, wherein the over power surge signal relates to a square root of line voltage.

8. A switched-mode power regulator according to claim 1, wherein the controllable current switching means is selected from a group comprising MOSFET transistors, Bipolar transistors, IGBTs and GTOs.

9. A method of monitoring an output voltage and an input voltage of a switched mode power regulator, said method comprising providing energy to a primary circuit of an energy storing device in a first period of time using controllable current switching means, said controllable current switching means forming part of the primary circuit, releasing energy from the energy storing device via a secondary circuit in a second period of time, characterized in that the input voltage provided to the energy storing device in the first period of time is monitored by a monitoring circuit, and that the output voltage from the secondary circuit in the second period of time is monitored by the same monitoring circuit.

10. A method according to claim 9, wherein the monitoring circuit provides a control signal in response a measured level of the input and output voltages, said control signal relating to the input voltage in the first period of time, and said control signal relating to the output voltage in the second period of time.

11. A method according to claim 10, wherein the provided control signal is used to control the controllable current switching means and thereby the operation of the switched-mode power supply.

* * * * *